(12) United States Patent
Chien

(10) Patent No.: US 10,371,330 B2
(45) Date of Patent: *Aug. 6, 2019

(54) LED PROJECTION NIGHT LIGHT

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 14/275,184

(22) Filed: May 12, 2014

(65) Prior Publication Data

US 2015/0070595 A1    Mar. 12, 2015

Related U.S. Application Data

(60) Continuation of application No. 12/914,584, filed on Oct. 28, 2010, now Pat. No. 8,721,160, which is a
(Continued)

(51) Int. Cl.
*F21V 33/00* (2006.01)
*F21S 8/00* (2006.01)
(Continued)

(52) U.S. Cl.
CPC .............. *F21S 8/035* (2013.01); *F21K 9/232* (2016.08); *F21S 4/28* (2016.01); *F21S 9/02* (2013.01);
(Continued)

(58) Field of Classification Search
CPC .. F21S 8/035; F21S 9/02; F21S 10/007; F21S 4/28; F21S 10/002; F21V 21/08; F21V 21/14; F21V 21/22; F21V 17/02; F21V 33/0052; F21V 14/003; F21V 14/006; F21V 23/00; F21V 13/02; F21V 14/06; F21V 14/08; F21V 23/04; F21V 21/30; F21V 23/0442; F21V 23/0471; F21V 29/00; F21V 5/04; F21V 21/29; G02F 1/1313; G03B 21/2046; G03B 23/00; G03B 21/142; F21K 9/135; F21K 9/232; F21Y 2115/10;
(Continued)

(56) References Cited

U.S. PATENT DOCUMENTS 2,478,336 A    8/1949 Stein et al.
3,756,710 A    9/1973 Taylor
(Continued)

*Primary Examiner* — Y M. Lee
(74) *Attorney, Agent, or Firm* — Bacon & Thomas, PLLC

(57) ABSTRACT

An LED projection night light for night time or dark area use includes a plug-in wall outlet night light or direct current operated night light with projection features to project an image, message, data, logo, or time on a ceiling, walls, floor, or other desired surface. The LED night light incorporates optics means such as an optics-lens, slides, openings, or cut-outs, and/or a transparent material piece, translucent material piece, telescope assembly, housing-member, slide-film, slide-disc, elastic-member, tilt-means, rotating-means, adjust-means, roller-means, mechanical-means, extend-means, convex lens, and/or concave lens designed to make the desired image, message, data, logo, or time project to the ceiling, walls, floor, or other desired surface to be seen by a viewer. The LED light has an interchangeable power source arrangement, permitting the night light to be selectively powered by either an AC powered sealed-unit or a DC powered battery-pack.

5 Claims, 7 Drawing Sheets

Related U.S. Application Data division of application No. 12/318,470, filed on Dec. 30, 2008, now abandoned.

(51) Int. Cl.

| | | |
|---|---|---|
| *F21S 9/02* | (2006.01) | |
| *F21V 21/08* | (2006.01) | |
| *F21V 21/14* | (2006.01) | |
| *F21V 21/22* | (2006.01) | |
| *F21V 17/02* | (2006.01) | |
| *G03B 23/00* | (2006.01) | |
| *F21V 14/00* | (2018.01) | |
| *F21S 10/00* | (2006.01) | |
| *F21S 4/28* | (2016.01) | |
| *F21V 14/08* | (2006.01) | |
| *F21V 29/00* | (2015.01) | |
| *F21V 23/04* | (2006.01) | |
| *F21K 9/232* | (2016.01) | |
| *F21V 21/30* | (2006.01) | |
| *F21W 121/00* | (2006.01) | |
| *G03B 21/14* | (2006.01) | |
| *F21V 21/29* | (2006.01) | |
| *F21Y 115/10* | (2016.01) | |

(52) U.S. Cl.
CPC ........... *F21S 10/002* (2013.01); *F21S 10/007* (2013.01); *F21V 14/006* (2013.01); *F21V 14/08* (2013.01); *F21V 17/02* (2013.01); *F21V 21/08* (2013.01); *F21V 21/14* (2013.01); *F21V 21/22* (2013.01); *F21V 23/04* (2013.01); *F21V 29/00* (2013.01); *G03B 23/00* (2013.01); *F21V 21/29* (2013.01); *F21V 21/30* (2013.01); *F21V 23/0442* (2013.01); *F21V 23/0471* (2013.01); *F21W 2121/00* (2013.01); *F21Y 2115/10* (2016.08); *G03B 21/142* (2013.01); *Y10S 362/80* (2013.01); *Y10S 362/806* (2013.01)

(58) Field of Classification Search
CPC ............. F21Y 2101/00; F21W 2121/00; Y10S 362/80; Y10S 362/806
See application file for complete search history.

(56) References Cited

U.S. PATENT DOCUMENTS

| | | | |
|---|---|---|---|
| 4,756,614 A * | 7/1988 | Kato et al. | ............. G03B 21/00 353/110 |
| 5,321,449 A | 6/1994 | Coccoli et al. | |
| 5,517,264 A | 5/1996 | Sutton | |
| 5,545,072 A | 8/1996 | Arad et al. | |
| 5,769,684 A | 6/1998 | Lou | |
| 5,934,223 A | 8/1999 | Ellery-Guy | |
| 7,056,006 B2 | 6/2006 | Smith | |
| 7,267,444 B2 | 9/2007 | Black, Jr. | |
| 7,438,446 B1 | 10/2008 | McCann | |
| 7,553,051 B2 | 6/2009 | Brass et al. | |
| 7,832,917 B2 | 11/2010 | Chien | |
| 7,832,918 B2 | 11/2010 | Chien | |
| 7,871,192 B2 | 1/2011 | Chien | |
| 2001/0007527 A1* | 7/2001 | Lammers | ................ F21V 5/048 362/268 |
| 2002/0089650 A1 | 7/2002 | Stewart | |
| 2008/0197374 A1 | 8/2008 | Sung | |
| 2015/0070938 A1* | 3/2015 | Chien | ...................... F21S 9/02 362/644 |

\* cited by examiner

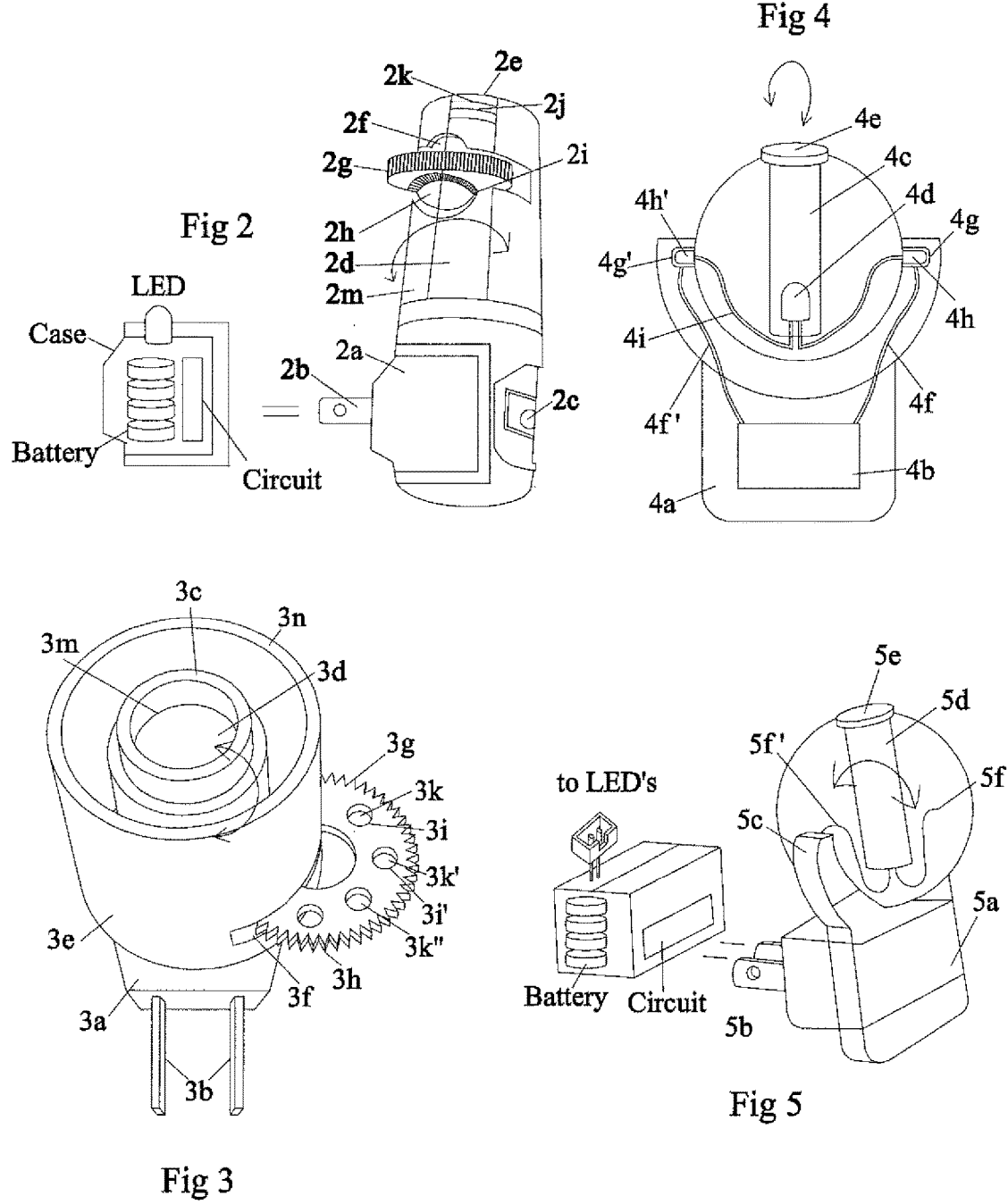

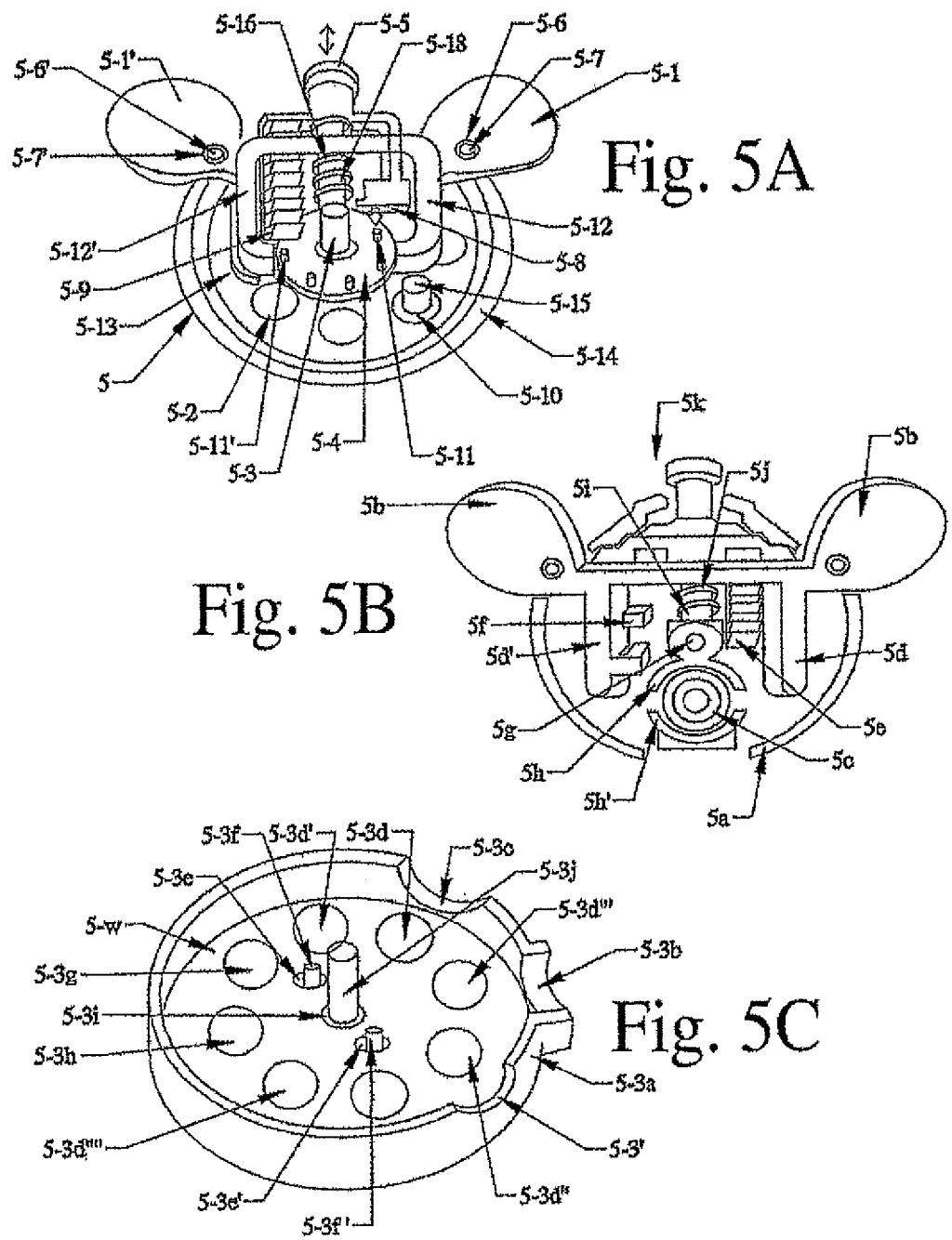

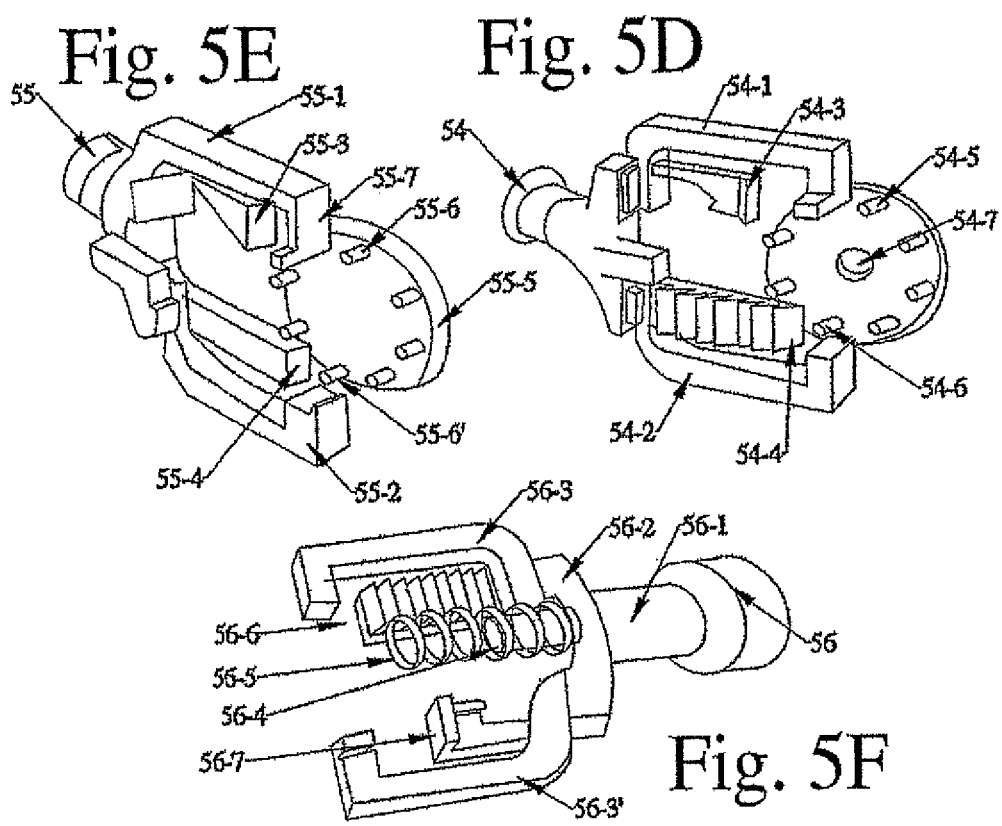
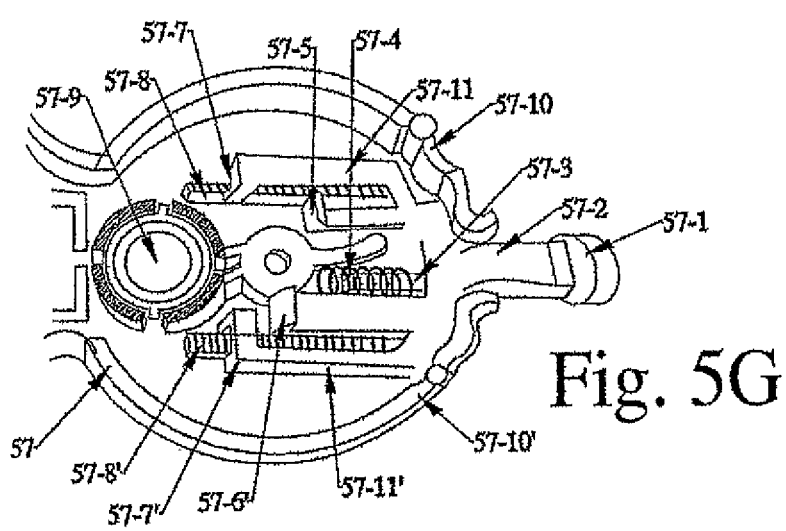

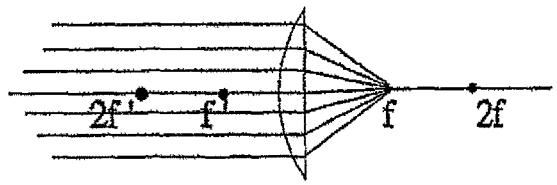

Fig 10

Base Physic theory for Lens focus

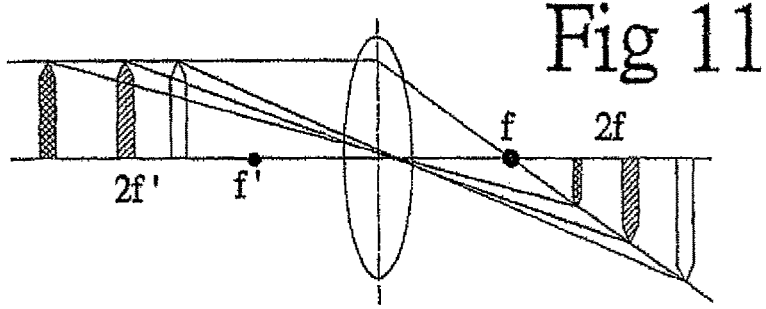

Fig 11

Basci Physic theory
Relation of object v.s. image v.s. focus of lens.
1. object on 2f ' object has same size of image on 2f.
2. object between f ' and 2f ' -->
   image behind 2f with large reverse image.
3. object away from 2f ' -->
   the image will fall within 1f and 2f
   with smaller and reverse image.

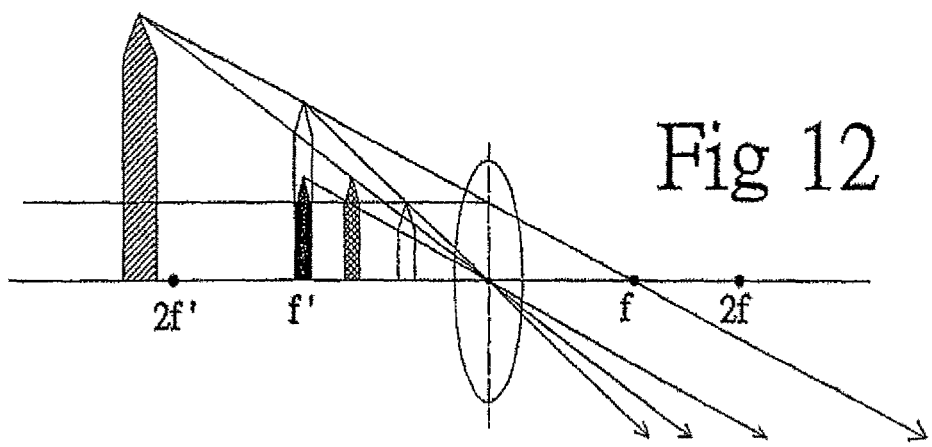

Fig 12

Object location < f '=>
Image located on the same side of the f '. Image size
will become more smaller while the object more close
the lens.

10,371,330 B2

LED PROJECTION NIGHT LIGHT

This application is a continuation of U.S. patent application Ser. No. 12/914,584, filed Oct. 28, 2010, which is a divisional of U.S. patent application Ser. No. 12/318,470, filed Dec. 30, 2008, incorporated herein by reference.

This application has subject matter in common with that of U.S. patent application Ser. No. 12/292,153 ("LED night light has projection or image feature"); Ser. No. 12/318,470 ("LED night light with Projection features"); Ser. No. 12/149,963 ("Removable LED light device"); Ser. No. 12/073,889 ("LED track light device"); Ser. No. 12/073,095 ("LED light with changeable position with Preferable power source"); Ser. No. 12/007,076 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 11/527,631 ("LED Night light with interchangeable display unit"); Ser. No. 11/498,881 ("Poly Night light"); Ser. No. 11/255,981 ("Multiple light source Night Light"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light"); ("Multiple Function Night light with Air Freshener"); Ser. No. 11/806,284 ("LED Night light with more than one optics medium"); Ser. No. 11/806,285 ("LED Night Light with multiple functions"); and Ser. No. 11/806,711 ("Multiple LEDs Light with adjustable angle function").

BACKGROUND OF THE INVENTION

The current invention projects a colorful image on a wall or ceiling at a desired location to enable people to view an image such as character, logo, message, animals, logo, time, space shutter, stars, moon, planet, silver-river, or a universal image and cause the people to have a pleasant mood when in a dark environment, or to fall asleep in a nice environment. it is especially important for youth or kids room applications to let them have their own favorite image surround them. It is also a great advertisement medium that not only promotes things but also offers a night light for illumination.

In a preferred embodiment, the current invention can take the form of a plug-in wall outlet LED night light having projection features to project the image, message, data, logo, and/or time on a ceiling, walls, or floor, or any other desired surface.

The night light of the current invention has as a light source an LED or LEDs, which may be the same as described in copending U.S. patent application Ser. No. 11/255,981 (now allowed) to provide a visible light beam that passes through an optics means or more than one optics means (as described in copending U.S. patent application Ser. No. 11/806,284) and creates an image at the desired location, preferably with one or more features selected from group including size, dimension, area, height, distance, color, brightness, time period, and trigger means.

The current invention preferably incorporates optics means such as an optics-lens or concave lens, and/or a telescope construction, openings, cut-outs, plastic parts, and a housing-member to create the preferred image at the desired location to enable the viewer to see the image and also offer illumination for a dark environment.

The current invention can also have a different construction which enables a person to change the slides by a roller or push button or other mechanical means. This will enable one night light to exhibit a plurality of different images that can be selected to project on the desired location The current invention also may utilize an optics-means having adjust-means to adjust the optics-means at any time and change the position of the image to any desired location by a tilt, rotating, or swivel mechanism, or adjustment-facilitating other construction.

The current invention may also enable a focus of the image to be adjusted by providing an extend-means that causes a housing-member to extend and change the position of a slide, light source, and/or lens.

The current invention may furthermore use a very simple telescope construction to enable the projection-means to be easily assembled into a related housing-member to become a finished LED projection night light.

The current invention utilizes physics or optics lens theory to cause the projected image to have a desired size, clearance, details, brightness, or other image specification.

In addition, the current invention may use the "sealed-unit" described in several of the Inventor's above-cited U.S. Patent applications. The sealed unit encloses all electric components, including a prong, circuit, trigger means, and/or an LED or LED connector, and seals the electric components within the "sealed unit" to provide a safe AC power source to turn on and turn off the said LEDs. The "sealed-unit" also can be replaced by a battery-pack which has all electric components within, including batteries, circuitry, trigger means, and/or an LED or LED connector within to cause the night light to illuminate according to a pre-determined function, timing, duration, and/or effects. This interchangeable battery-pack and sealed-unit of the night light enables the "power source" to be changed from AC to DC or DC to AC.

Finally, the current invention can combine the arrangements disclosed in the inventor's copending U.S. patent application Ser. Nos. 11/255,981 and 11/806,284 for more than one light source and more than one of optics means with the arrangement described in the inventor's U.S. Pat. No. 5,667,736 for a grating or hologram to create a variety of different images and obtain an optimal image projection on the wall, ceiling, or floor, as required.

BRIEF DESCRIPTION OF THE DRAWINGS

As shown in FIG. 1, the night light has a super bright white LED incorporated with telescope assembly, and a plurality of slides that serve as an optics-means to create an image at a desired position while allowing the image to be changed.

FIGS. 2 and 3 illustrate a second preferred embodiment of an LED projection night light with changeable slides installed in a roller. In addition, FIGS. 2 and 3 illustrates a night light with a "sealed-unit" for electric components such as a prong, circuit, trigger means, LED or LED connector, the components being sealed within the "sealed unit" to pass all relevant home appliance safety standards required for certification without having to separately certify the night light in which the sealed unit is included even when the construction of the night light, apart from the electrical components, is changed, and the "sealed unit" being replaceable by a "battery pack" to change from an AC power operated night light to a battery or DC power operated night light.

FIGS. 4 and 5 illustrate a third preferred embodiment of an LED projection night light, which includes adjust-means to change the projector direction by rotation. FIGS. 4 and 5 also show that the night light has a "sealed-unit" for all electric components similar to the sealed unit of FIGS. 2 and 3, to allow different night lights to pass all home appliance safety standards and achieve certification without having to undergo separate testing of the different night lights in which the common safety unit is included. The "sealed unit" of FIGS. 3 and 4, like that of FIGS. 2 and 3, can be replaced by a "battery pack" to change from an AC power operated night light to a battery or DC operated night light.

FIGS. 5A to 5G show details of a mechanical means which can change the slides by push-button, and further that the night light has a "sealed-unit" of the type described above in connection with FIGS. 4 and 5.

FIGS. 10-12 illustrate an optics theory used by the current invention and application of the theory to create a desired image.

DETAIL DESCRIPTION OF THE PREFERRED EMBODIMENTS

The LED night light with projection features of the current invention is different from a conventional projection pen, projection key chain, projection toy, or commercial presentation projection equipment. One difference is that it is used mainly for night light applications with an LED or LEDs as a light source to directly plug into an outlet device, and as a result the circuit needs to be specially designed to make use of AC 110V 60 Hz input power to drive the LED or LEDs.

The current invention incorporates optics-means, which may include an optics-lens, slides, openings, cut-outs, a transparent material piece, a translucent material piece, a telescope assembly, a housing-member, a slide-disc, roller-means, an elastic-member, tilt-means, rotating-means, adjust-means, roller-means, mechanical-means, extend-means, a convex lens, a concave lens, and other elements calculated and designed to make the image, message, logo, characters, sign, time, and data project onto a desired surface such as a ceiling, walls, floor, or any other desired location.

The current invention also may provide a geometric design for the whole night light, and is not limited to the preferred embodiments. An alternative construction for the night light, for example with different tilt, swivel, rotating, projection-position-change, focus-adjustable means, and/or slide-change features should still fall within the scope of the current invention.

Figure 1:
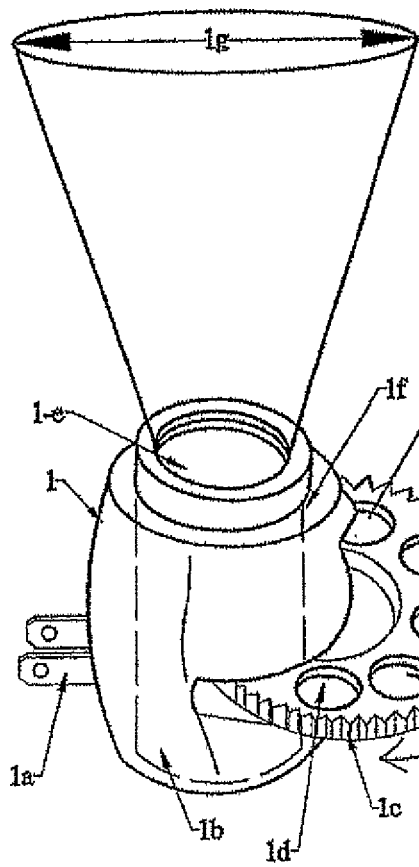
FIG. 1 illustrates a first preferred embodiment of an LED projection night light, in the form of a plug-in type night light to connect with an electric wall outlet.

As shown in FIG. 1, a preferred LED projection night light (1) has a telescope assembly (1b) that fits within a body (1f) with a top opening (1e) to project the image to a top area to form an image having a certain size (1g) at a certain distance from the opening (1e). The night light body has a built-in mechanism or mechanical-means for installing a roller-means (1c) with a plurality of slides (1d) (1D') (1d") so that people can change slides at any time and project different images on the area (1g) through the top opening (1e). The LED projection light further includes prongs 1a.

Figure 1A:
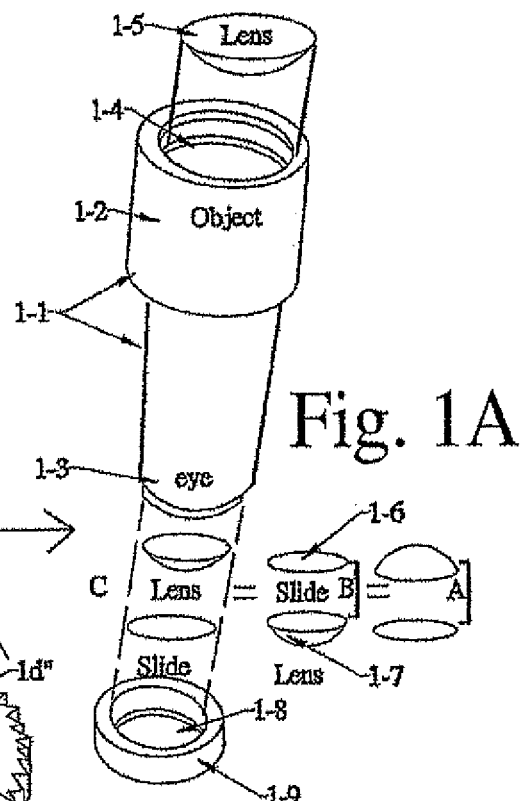
FIG. 1A illustrates the manner in which the telescope assembly and slides-as-optics-means of FIG. 1 are placed in front of the super bright LED to allow a clear image to be projected to the desire location.

As shown in FIG. 1A, the telescope-assembly has a housing-member (1-1) with an object-end (1-2) and eye-piece (1-3) having a preferred optics lens (1-5), lens (1-7), and slide (1-6) for each end. The lens (1-7) and slide (1-6) can have different positions as illustrated for different image requirements. The convex lens of arrangement (A) faces inside to make incoming LED light beams into parallel light beams as they hit the slide so the image will be very clear. The arrangements (B) or (C) do not affect the image as much but are not clear as arrangement (A). It will be appreciated that alternative arrangements for the telescope-assembly will still fall within the scope of the current invention. These may utilize the alternative constructions illustrated in FIG. 9A. The optics lens, telescope length, lens diameter, and/or focus can all be well designed to get a desired image quality and size out of the LED projection night light.

Figure 1B:
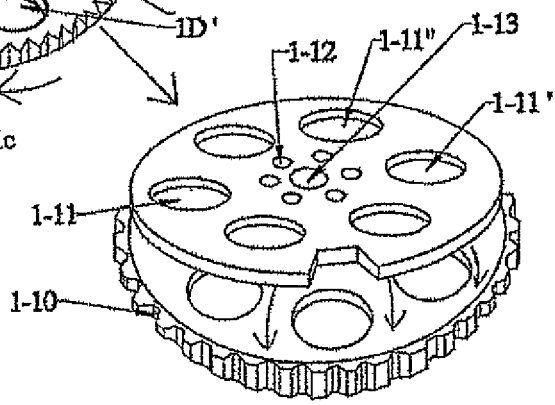
FIG. 1B shows a roller in which a plurality of slides can be installed and which can be assembled into the night light housing-member to enable the slides to be changed at any time to select a preferred image.

As shown in FIG. 1B, the roller-means has a base (1-10) which has certain holes (1-11) (1-11') (1-11") and poles (1-12) (1-13) to hold the plurality slides in position and also receive incoming LED light beams so that they hit one of the slides to project colorful images on the slide to a desired location at a certain distance. Some applications do not need the roller-means for a plurality of slides. So long as the slide-film has fixing-holes, there is no need for any roller-means to help hold the slide-film. The current embodiment, however, lets people rotate the roller-means in order to enable people handle and change slides.

FIG. 2 illustrates a plug-in LED night light (2a) with projection features. At least one LED (not shown) serves as a light source to supply visible light beams. At least one of the telescoping optics-means (2d) incorporates a tube (2h) and lens (2l), an LED or LEDs, slide(s)-film (2i), film, openings (2e), cut-outs (2f), a transparent material piece (2m), translucent material, grating means, and/or hologram means to project a desired image, message, data, logo, or time on a ceiling, walls, floor, or other desired surface. At least one of a power source (2b), circuit means (inside of 2a), and trigger means (2c) are arranged to work with the LED or LEDs to provide a desired light function, timing, colors, brightness, and/or illumination. The LED projection night light device (2a) has a changeable slide, film, angle, projection position, orientation, light functions, and/or light effects features.

As shown in FIG. 2, the current invention may also use the "sealed-unit" described in the U.S. patent applications of the inventor that are listed below. The "sealed unit" contains all electric components including for example a prong, circuit, trigger means, and LED or LED connector, which are sealed within to safely enable an AC power source to turn on and turn off the LEDs. The "sealed-unit" also can be replaced by a battery-pack which has all electric components within, including batteries, circuit, trigger means, LED or LED connectors, to cause the night light to illuminate and exhibit a predetermined function, timing, duration, and/or effects. The "sealed unit" is described in detail in the following U.S. patent applications, which are herein incorporated by reference:

(1) U.S. patent application Ser. No. 11/527,631 ("LED Night light with interchangeable display unit").

(2) U.S. patent application Ser. No. 11/498,881 ("Poly Night light").
(3) U.S. patent application Ser. No. 11/255,981 ("Multiple light source Night Light").
(4) U.S. patent application Ser. No. 11/094,215 ("LED Night light with Liquid optics medium").

The LED light of this embodiment includes a base having an empty inner space arranged to receive a "sealed unit" of the type disclosed in the above-listed applications with the above discussed circuit-means, sensor-means, switch-means, timer-means, IC-means, prong-means etc.

The "sealed-unit" with its own power, LED, circuit-means, and attachment means is arranged so that it can fit into any LED light housing as long as the housing has a uniform compartment. The "AC powered sealed unit" is arranged to be connected to a 110 Volt 60 Hz or other high voltage connection while meeting all safety standards to make sure that the night light does not present any hazard, risk of electrical short circuit, or potential damage by being subjected to multiple testing standards and procedures for related safety certification.

The uniform compartment in the LED light housing is constructed and has dimensions so it is easy to design the "sealed-unit" to fit into this compartment. The current invention also provides a "DC battery-pack" which has its own outside dimension similar to that of the "sealed unit" so that it can fit into the "uniform compartment" too. The "DC powered battery-pack" can replace the "AC powered sealed-unit" at any time because both have their own power, LEDs, circuit-means, and attachment means that enable it to fit the same LED light housing as long as there have uniform compartment.

As a result, the LED light of the illustrated embodiment can change its power source from AC to DC or DC to AC. This is a further improvement over the "AC power sealed-unit" above-listed patent applications of the inventor. This is big improvement that not only saves a lot of tooling for different shape LED lights but also saves a lot of safety testing laboratory expense and time. Furthermore, the interchangeable power source also can save a lot of tooling cost and time and labor and still provide a good LED light having a pinhole-imaging function (or other LED lighting fixture, laser LED light device, etc.) with a same nice shape but with different power sources to enable the light to be put in different locations where people stay. This is one of the big features of the current invention. Not only all different shapes of LED night light, but also a traditional puck light, can be powered by a DC battery and also by AC as long as people pay for extra parts that let the traditional puck light be plugged into an AC outlet.

As shown in FIG. 2, the LED night light (2a) has a base with prong (2b), sensor (2c), and a preferred circuit inside the base to turn on the LED or LEDs to supply a light beam that projects an image on the slide(s)(2i) to the top ceiling. The night light has a top lens (2m) having an opening (2e) to allow the telescope optics-means (2d) lens (2k) to be installed and project the image to the top ceiling. The top lens (2m) also has a cut-out (2f) to allow the rotatable slide-disc (2g) to be installed and the slides (2i) to be changed by rotating the slide-disc (2g) to one of a plurality of the slides (2i).

FIG. 3 shows more details of the construction of the embodiment of FIG. 2. As described above, this embodiment includes an outer housing 3n, a prong (3b) on the night light (3a) with a top lens (3e) having a top opening (3c) to allow the telescope optics-means (3m) to be installed and the image to be projected through the top optics-lens (3d) to the ceiling. The rotatable slide-disc (3g) with gear teeth 3h has a plurality of slides (3k) (3k') (3k'') securely installed on the discs (3i) (3i') (3i'') so that rotation of the disc (3g) enables a user to easily change the slide and project the preferred image on the ceiling. The top lens (3e) has a cut-out (3f) to allow the rotating slide-disc to be properly installed.

FIG. 4 illustrates another embodiment of a plug-in LED night light (4a) with projection features. At least one LED (4d) serves as a light source to supply visible light beams. At least one telescope optics-means (4c) is incorporated with the LED (4d) or LEDs or slide(s) (not shown), film, openings (4e), cut-outs, a transparent material piece, a translucent material piece (ball), grating means, and/or hologram means to project the desired image, message, data, logo, or time on the ceiling, walls, floor, a desired surface, or the optics means surface. At least one of the power source (not shown), circuit (4b)(4f) (4g) (4h) (4i), and trigger means (not shown) is arranged to work with the LED (4d) or LEDs to provide a desired light function, timing, colors, brightness, and/or illumination. The LED projection night light device (4a) has a changeable slide, film, angle (for example, if a ball is provided as shown, the ball can rotate), position (again, the ball can rotate), orientation (the ball can rotate), light functions, and light effects features.

As shown in FIG. 4, the plug-in night light (4a) has a power source and circuit (4b) inside the base, with conductive means (4f) (4g)(4h)(4i) to deliver electric signals to the LED (4d) to supply a light of sufficient brightness into the telescope optics-means and its slides (4c) to allow the slide image to be project to the top through the opening (4e) of the ball housing. The ball housing has a rotatable electric connector (4g) (4h) and (4g') (4h') to allow electric signals to be delivered from the base to inside the ball. It also offers a rotating property to allow the ball housing to be rotated so as to make the telescope project the image to a desired location, surface, or areas.

FIG. 5 shows a more simple construction. The plug-in night light with projection features (5a) of FIG. 5 has a power source input from the prong (5b) through the inner circuit (not shown) and conductive means (5f) (5f') to the inner LED or LEDs in order to supply a super bright light beam to project the slide's image to the top area. In addition, the embodiment of FIG. 5 utilizes a "sealed-unit" (5c) which contains all electric components including a prong, circuit, trigger means, LED or LED connector, as described above, in order to obtain power from an AC power source to turn on and turn off the LEDs. The "sealed-unit" also can be replaced by a battery-pack which has all electric components within, including batteries, a circuit, trigger means, an LED, and/or LED connectors, to provide night light illumination according to a pre-determined function, timing, duration, and effects.

FIG. 5A shows a preferred embodiment (5), including details of mechanical-means (5-w) to allow people to change the slide (5-2) (5-3a), (5-3b), (5-3c), (5-3h), (5-10) by push-button (5-5). The mechanical-means enables slides (5-2) (5-10) in a slide-film to fit into the center pole (5-30) and some side-poles (FIGS. 5-3, 5-3f and 5-3f') so as to hold the slide-film in position very tightly. The slide-film also has holes (not shown) to connect with the pole-disc (5-4) and the top of the pole-disc has several equally spaced bars which are pushed by a push-means into a certain space to precisely position the next slide at a position that allows the LED light beams to intersect the slide at a correct orientation and project the slide's image to the desired location. The pole-disc (5-4) and its poles (5-11) (5-11') are pushed by the push means (5-8) (5-9). The push-means (5-8) has a very big contact surface to make sure the force can been applied to the pole (5-11) so as to move the pole a certain distance to allow a next slide move to a correct position relative to the LED light beam. The push-means (5-9) has more of a catching purpose to make sure the pole (5-11') moves a certain distance and is locked in position. Hence, the push-means (5-8) (5-9) set enables a slide and a next slide to move very precisely into position. A resilient-means (5-16) is situated within the holder (5-18) and the holder has a stopper (5-3) to prevent the resilient-means (5-16) from falling apart and also offer a wall to let the push-button (5-5) move back and forth to change a slide at any time. A press means has two decorative parts (5-1) (5-1') and holding-parts (5-12) (5-12') to hold all other parts in position without falling apart because of the resilient-means (5-16).

FIG. 5B shows another viewing angle for the push-button construction of FIG. 5-1. The push-button (5K) is pushed by the resilient-means (5*i*) to cause the hold-bar (5*j*) to also move down. The resilient-means (5*i*) will hit the stopper-means (5*g*) and return it to its original position after the pushing force is removed from the push-button (5*k*). At the same time, the push-means (5*e*) (5*f*) moves down to push the pole-disc's poles and move the next slide to a correct position. A press-means has decorative parts (5*b*) (5*b'*) and hold-parts (5*d*) (5*d'*) to hold all parts tightly in position.

FIG. 5C shows a slide-film (5-3W) having a plurality of slides (5-3*d*) (5-3*d'*) (5-3*d"*) (5-3*d'''*) (5-3*d''''*) (5-3*g*) equally spaced on the slide-film. The slide-film has a plurality of positioning poles, and a center hole (5-3*i*) to position the pole (5-3*j*). The two sides have another two positioning holes (5-3*e*) (5-3*e'*) to position the poles (5-3*f*) (5-3*f'*) and make sure the slide-film with its plurality of slides is situated at a proper position.

FIGS. 5D, 5E, 5F, and 5G illustrate further details of the embodiment of FIGS. 5-1 and 5-2 at different viewing angles and with different details for each part. Details that have already been discussed will not be discussed again. However, the larger illustration and drawing may be helpful in further clarifying the details discussed above. It will be appreciated that the current preferred embodiment involves a particular mechanical-means to change slide position, but that all other equivalent or same functions, and/or alternative construction, skills, arrangements, and methods of changing the slide position may still fall within the scope of the current invention.

Figure 6:
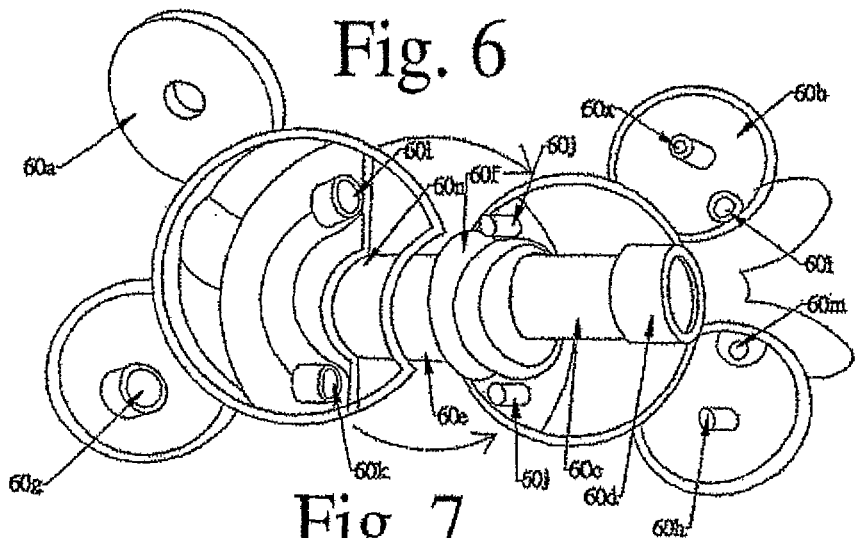
FIGS. 6-8 illustrate a fourth preferred embodiment, including details of a housing-member, telescope assembly, optics lens, and slides to provide an alternative construction of an LED projection night light.

FIG. 6 shows a telescope means (60*c*) and optics-lens assembly (60*d*) inside two half housings (60*a*) (60*b*). The two halves of the housing (60*a*) (60*b*) are assembled together by screws extending through the poles (60*j'*) (60*j*) and holders (60*i*) (60*k*) to be received in holes (60*l*) (60*m*). The telescope means (60*c*) includes outer housing, (60*n*) and extendable tube (60*c*), as well as lens assembly (60*d*).

Figure 7:
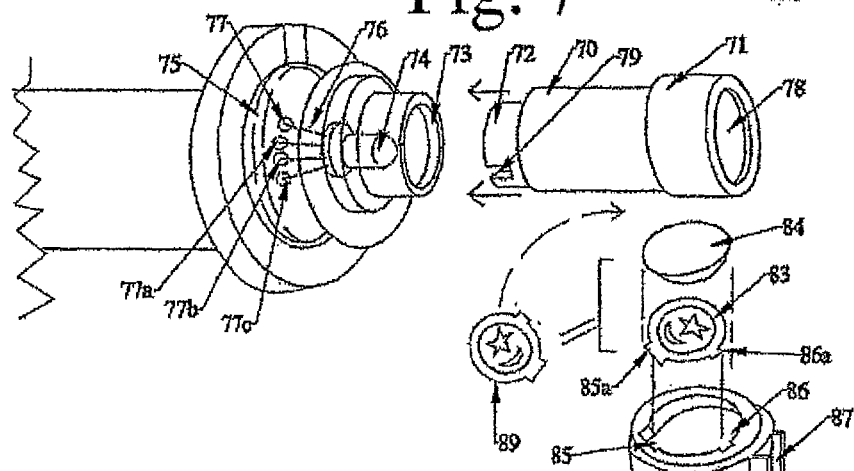

FIG. 7 illustrates details of a telescope (70) with a top portion (71) having a convex lens (78) inside and inserted into a housing opening (73) by a connector tube (72). The other end (72) of the telescope (70) has a film (not shown) and convex lens (not shown) that are clipped-tight in location to make a tiny image on the slide become a large image on the top of the telescope. The end (72) is inserted into the receiving end (73) so that an LED light beam from at least one LED (74) connected via leads (77*a*) (77*b*) (77*c*) to a circuit board (75) can be input to the telescope to make the image project to a desired surface. The LED (74) is installed on an inner circuit-means and connected with a preferred power source from an outlet or batteries (separate power source) to cause the LED to turn on with a predetermined time, function, duration, and effects.

Figure 8:
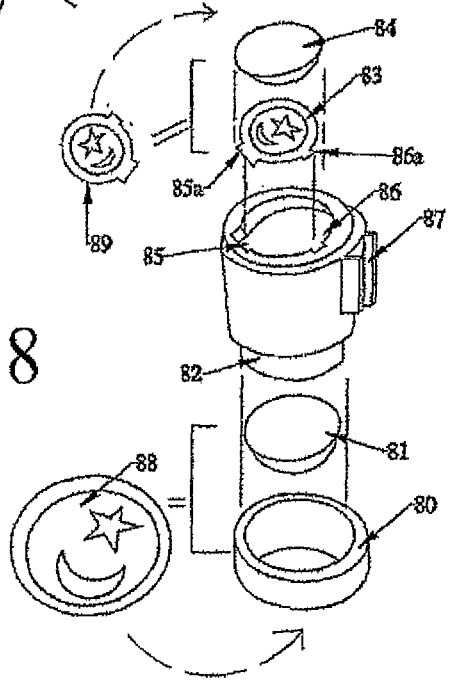

FIG. 8 shows a detailed construction of a telescope (87) which has a top cover (80) to hold the convex lens (81) in position. The other end of telescope (87) has two grooves (85) (86) to hold the slide's (83) two extended-ends (85*a*) (86*a*) and thereby hold the slide in position without any deviation. The small convex-lens (84) is clipped-tight on the telescope. The image seen from the small end of the telescope is a tiny image (89) but the image seen from the front of the telescope is a very large image (88) because the telescope enlarges the tiny image to a bigger size.

Figure 9A:
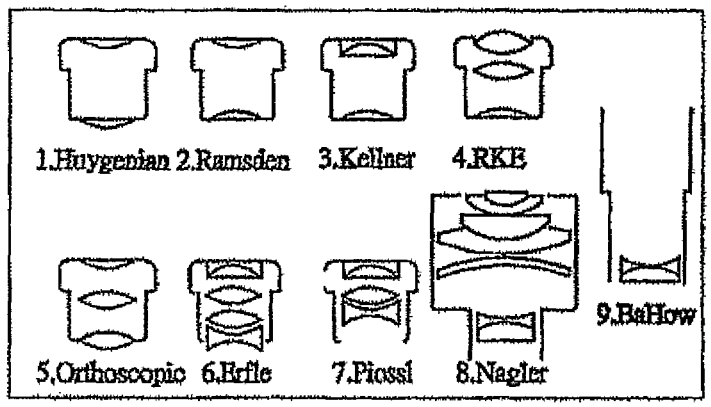
FIG. 9A shows preferred telescope assembly examples.

FIG. 9A shows an alternative telescope-assembly that can also be used to obtain a desired image.

Figure 9:
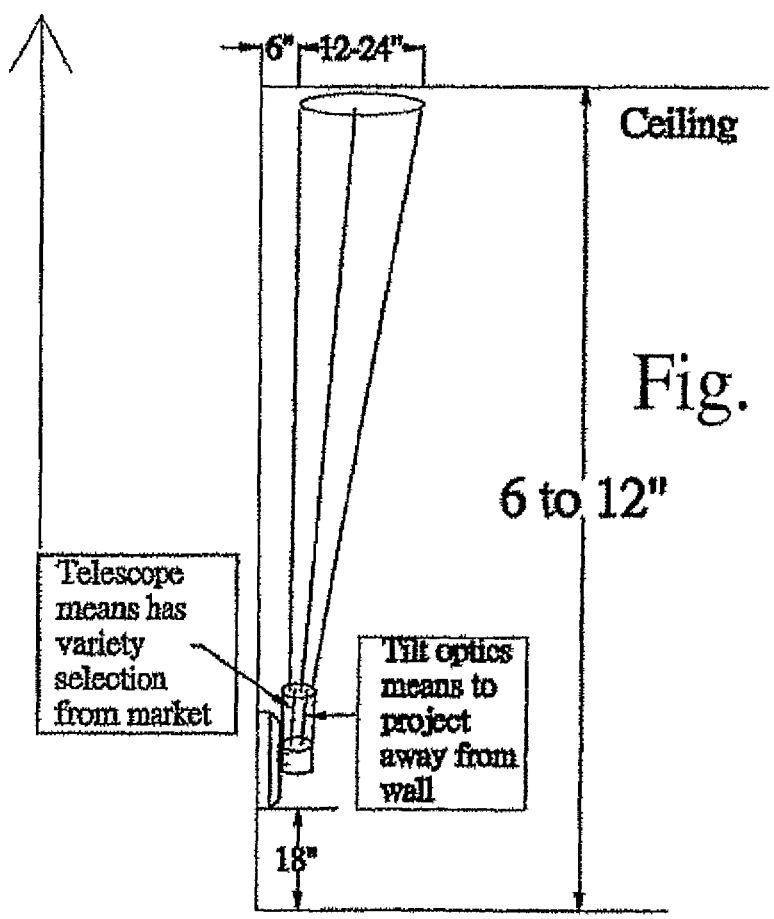
FIG. 9 shows an LED projection night light utilized in a bedroom.

FIG. 9 shows one of the considerations in enabling an LED projection night light for indoor applications to project images on a ceiling by tilting the optics means to more the image away from the wall and project 100% of the image at the ceiling.

FIGS. 10-12 illustrate basic optic lens theory, which is applied to the current invention to precisely calculate the optics lens, focus, position of the light source, position of all lenses, position of the slides, and/or telescope length to get a desire image that is as perfect as possible.

Although preferred embodiments of the invention have been described in detail to show the scope of the current invention, it is to be appreciated that any alternative or equivalent functions, or design, construction, modification, and/or up-grade, may still fall within the scope of the invention, which is not limited by the details mentioned in the above discussion. Any alternative or equivalent arrangement, process, installation or the like may still fall within the scope of the current invention, including alternatives to the power source, conductive means, geometric shape of LED-units, joint-means, circuit means, sensor means, switch means, LED elements, attachment means, fixing-means, tightening means, and/or resilient conductive means, which may all have alternative arrangements, design, and construction.

I claim:

1. An LED projection light, comprising:
   at least one LED arranged to emit visible light beams; and
   at least one power source connected to circuitry to cause said at least one LED to exhibit at least one of a desired light function, timing, color, and brightness,
   wherein:
   said LED projection light is a plug-in AC powered light having at least one conductive kit to be connected to an electrical outlet,
   said LED projection light includes at least one optical lens installed on a top of a housing or on a top of at least one tube incorporated with the LED for projecting said light through one or more than one of a plurality of different image forming elements to cause a desired image, message, data, logo, or time to project onto a ceiling, walls, floor, or other desired surface, and
   said image forming elements being mounted in a holding member or disc incorporated with a tube-assembly or the housing and including at least one of slides and films, and
   further comprising a changing mechanism for enabling a user to change one of said plurality of image forming elements to a different one of said plurality of image forming elements, by moving the holding member from a first position in which said one of a plurality of image forming elements is in front of said at least one LED to a second position in which said different one of said image forming elements is in front of said at least one LED to change said image, message, data, logo or time.

2. An LED projection light as claimed in claim 1, further comprising at least one of the following elements: (a) a telescope assembly, (b) a tilt assembly for tilting said optical lens, (c) a rotating assembly for rotating said optical lens and image forming elements, (d) an adjust assembly for adjusting said optical lens, (e) a roller assembly to move the optical lens or image forming elements, and (f) an elastic member to change a projection direction of said light.

3. An LED projection light as claimed in claim 1, wherein said changing mechanism includes at least one of a roller, an elastic member, a push button, and a movement-device.

4. An LED projection light as claimed in claim 1, wherein a projection direction and/or image is changed by at least one of a rotating-assembly, a tilt-assembly, a swivel-assembly, a housing-assembly, and a bend-assembly.

5. An LED projection light as claimed in claim 1, further comprising an extend assembly that changes a relative position of said holding member, said at least one LED, and/or said optical lens to adjust a focus of said image.

* * * * *